United States Patent
Alkalay et al.

(10) Patent No.: US 12,141,472 B2
(45) Date of Patent: Nov. 12, 2024

(54) PROVIDING COMMUNICATION BETWEEN STORAGE PROCESSORS THROUGH AN INTERCONNECT AND A SET OF STORAGE DEVICES

(71) Applicant: Dell Products L.P., Round Rock, TX (US)

(72) Inventors: Amitai Alkalay, Kadima (IL); Boris Glimcher, Brooklyn, NY (US); Aric Hadav, Tel Aviv (IL); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/095,687

(22) Filed: Jan. 11, 2023

(65) Prior Publication Data
US 2024/0241666 A1    Jul. 18, 2024

(51) Int. Cl.
*G06F 3/06*    (2006.01)

(52) U.S. Cl.
CPC ............ *G06F 3/0658* (2013.01); *G06F 3/061* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 7,424,554 B1 * | 9/2008 | Sardella | G06F 3/0632 709/221 |
| 8,374,731 B1 * | 2/2013 | Sullivan | H05K 7/20836 700/12 |
| 9,817,607 B1 * | 11/2017 | Harvey | G06F 3/0689 |
| 9,940,280 B1 * | 4/2018 | O'Brien | G06F 13/382 |
| 11,698,878 B1 | 7/2023 | Douglas et al. | |
| 2007/0005880 A1 * | 1/2007 | Burroughs | G06F 3/0626 711/112 |
| 2012/0166699 A1 * | 6/2012 | Kumar | G06F 13/385 710/305 |
| 2018/0059933 A1 | 3/2018 | Helmick et al. | |
| 2021/0075633 A1 | 3/2021 | Sen et al. | |
| 2021/0318808 A1 * | 10/2021 | Walker | G06F 3/0689 |
| 2022/0346243 A1 * | 10/2022 | Zhang | H05K 5/0069 |
| 2023/0244614 A1 | 8/2023 | Benisty et al. | |

* cited by examiner

*Primary Examiner* — Kaushikkumar M Patel
(74) *Attorney, Agent, or Firm* — BainwoodHuang

(57) ABSTRACT

Techniques provide communication between storage processors (SPs) of a storage array. The techniques involve electrically coupling the SPs with an interconnect of the storage array. The techniques further involve electrically coupling a storage device having dual on-device controllers with the interconnect. The techniques further involve establishing a communications pathway between the SPs through the interconnect and the storage device having the dual on-device controllers while the SPs are electrically coupled with the interconnect and while the storage device is electrically coupled with the interconnect.

19 Claims, 8 Drawing Sheets

PROVIDING COMMUNICATION BETWEEN STORAGE PROCESSORS THROUGH AN INTERCONNECT AND A SET OF STORAGE DEVICES

BACKGROUND

A conventional data storage system includes a storage system chassis, a midplane, storage processor modules, and dual port disk drives. The storage system chassis holds the midplane so that the storage processor modules and the dual port disk drives can insert therein and electrically connect with the midplane.

Once the storage processor modules and dual port disk drives are inserted into the chassis and are electrically connected with the midplane, the storage processor modules are able to access the dual port disk drives through the midplane, e.g., via Peripheral Component Interconnect Express (PCIe) communications. Additionally, the storage processor modules are able to communicate directly with each other through the midplane, e.g., via Ethernet communications.

SUMMARY

Unfortunately, in the above-described conventional data storage system, the bandwidth between the storage processor modules is limited to that which is provided by the interconnect traces that connect the storage processor modules directly to each other. That is, the interconnect traces are able to convey a very limited amount of data during a set amount of time. Nevertheless, there may be advancements in storage processor module technology that could provide benefits/advantages if there is greater bandwidth between the storage processors modules (e.g., due to advancements/optimizations in storage processor module throughput, due to faster storage processor module operating speeds, combinations thereof, etc.).

In contrast to the above-described conventional data storage system in which the bandwidth between the storage processor modules is limited to that which is provided by the interconnect traces that connect the storage processor modules directly to each other, improved techniques are directed to providing communication between storage processors (SPs) through an interconnect and a set of storage devices (i.e., one or more storage devices) Along these lines, dual port capabilities of the set of storage devices may be leveraged to provide communications bandwidth between the SPs (by looping back messages from one SP to another SP). For an existing interconnect, the set of storage devices may enable an efficient scalable connection to be provided between SPs (or storage nodes) without modifications to the existing interconnect and without requiring additional cabling and/or SP hardware. Additionally, in accordance with certain embodiments, multiple storage devices may be used to aggregate/scale bandwidth through the interconnect for high information exchange among the SPs.

One embodiment is directed to a method of providing communication between SPs of a storage array. The method includes electrically coupling the SPs with an interconnect of the storage array. The method further includes electrically coupling a storage device having dual on-device controllers with the interconnect. The method further includes establishing a communications pathway between the SPs through the interconnect and the storage device having the dual on-device controllers while the SPs are electrically coupled with the interconnect and while the storage device is electrically coupled with the interconnect.

Another embodiment is directed to data storage equipment which includes an interconnect, SPs constructed and arranged to electrically couple with the interconnect, and a storage device constructed and arranged to electrically couple with the interconnect. The storage device is constructed and arranged to establish at least a portion of a communications pathway between the SPs while the SPs are electrically coupled with the interconnect and while the storage device is electrically coupled with the interconnect.

In some arrangements, the SPs of the storage array include a first SP and a second SP. Additionally, establishing the communications pathway includes providing a first link between the first SP and the storage device through the interconnect, and providing a second link between the storage device and the second SP through the interconnect.

In some arrangements, the dual on-device controllers of the storage device include a first on-device controller and a second on-device device controller. Additionally, providing the first link includes creating, as the first link, a first segment of the communications pathway from the first SP to the first on-device controller. Furthermore, providing the second link includes creating, as the second link, a second segment of the communications pathway from the second on-device controller to the second SP.

In some arrangements, establishing the communications pathway further includes creating, as a third link, a third segment of the communications pathway from the first on-device controller to the second on-device controller.

In some arrangements, the method further includes, after the first, second and third links are created, relay messages from the first SP to the second SP through the first, second and third links.

In some arrangements, the SPs of the storage array include a first SP and a second SP. Additionally, establishing the communications pathway includes creating a virtual redirection namespace within the storage device, and creating a set of queues within the virtual redirection namespace to coordinate conveyance of messages from the first SP to the second SP.

In some arrangements, creating the set of queues includes configuring a submission queue to hold submission queue entries identifying locations of messages written by the first SP into the virtual redirection namespace to be processed, sizes of the messages, and destination locations within the second SP for the messages.

In some arrangements, creating the set of queues further includes configuring a completion queue to hold completion queue entries that identify locations of messages written by the first SP into the virtual redirection namespace that have been processed.

In some arrangements, establishing the communications pathway further includes providing a set of doorbell registers to indicate when an entry has been added to the set of queues.

In some arrangements, the storage device is a solid state drive (SSD). Additionally, the dual on-device controllers of the storage device include a first SSD controller and a second SSD controller. Furthermore, establishing the communications pathway includes configuring the first SSD controller and the second SSD controller to communicate with each other to provide, as a portion of the communications pathway, a loopback path from the first SSD controller to the second SSD controller.

In some arrangements, electrically coupling the SPs with the interconnect of the storage array includes connecting a first SP to the interconnect, and connecting a second SP to the interconnect. Additionally, electrically coupling the storage device having the dual on-device controllers with the interconnect includes connecting the SSD to the interconnect to enable (i) the first SP and the first SSD controller to communicate with each other through the interconnect and (ii) the second SP and the second SSD controller to communicate with each other through the interconnect.

In some arrangements, the SSD includes a first port and a second port. Additionally, configuring the first SSD controller and the second SSD controller to communicate with each other includes exchanging signals between the first SP and the first SSD controller through a first set of traces of the interconnect and the first port of the SSD, and exchanging signals between the second SP and the second SSD controller through a second set of traces of the interconnect and the second port of the SSD. The second set of traces is different from the first set of traces.

In some arrangements, the first set of traces includes first Peripheral Component Interconnect Express (PCIe) lanes. Additionally, the second set of traces includes second PCIe lanes. Furthermore, the method further includes performing first direct memory access (DMA) operations that provide the first SP with sharable DMA to SSD memory of the SSD through the first PCIe lanes, the first SSD port and the first SSD controller, and performing second DMA operations that provide the second SP with sharable DMA to the SSD memory of the SSD through the second PCIe lanes, the second SSD port and the second SSD controller.

In some arrangements, the first set of traces includes first PCIe lanes. Additionally, the second set of traces includes second PCIe lanes. Furthermore, the method further includes accessing SSD memory of the SSD in accordance with the non-volatile memory express (NVMe) protocol.

In some arrangements, the communications pathway is established as a first single direction channel to convey first messages in a first direction from the first SP to the second SP. Additionally, the method includes establishing another communications pathway between the SPs through the interconnect and the storage device having the dual on-device controllers while the SPs are electrically coupled with the interconnect and while the storage device is electrically coupled with the interconnect. The other communications pathway is established as a second single direction channel to convey second messages in a second direction from the second SP to the first SP.

In some arrangements, the method further includes conveying third messages between the SPs through interconnect. The third messages pass only through the interconnect and avoid passing through any storage device.

In some arrangements, the method further includes electrically coupling another storage device having dual on-device controllers with the interconnect. The method further includes establishing another communications pathway between the SPs through the interconnect and the storage device having the dual on-device controllers while the SPs are electrically coupled with the interconnect and while the other storage device is electrically coupled with the interconnect.

In some arrangements, the method further includes aggregating bandwidth provided through the storage devices to increase overall bandwidth between the SPs. Such aggregation enables bandwidth contributions from the storage devices to be combined/scaled/etc. without further cabling and/or SP hardware.

It should be understood that, in the cloud context, at least some of electronic circuitry is formed by remote computer resources distributed over a network (e.g., additional SPs, hosts, etc.). Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic assemblies, components and circuitry which are involved providing communication between SPs through an interconnect and a set of storage devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing communication between storage processors (SPs) through an interconnect and a set of storage devices. Along these lines, dual port capabilities of the set of storage devices may be leveraged to provide communications bandwidth between the SPs (by looping back messages from one SP to another SP). For an existing interconnect, the set of storage devices may enable an efficient scalable connection to be provided between SPs (or storage nodes) without modifications to the existing interconnect and without requiring additional cabling and/or SP hardware. Furthermore, in accordance with certain embodiments, multiple storage devices may be used to aggregate/scale bandwidth through the interconnect for high information exchange among the SPs.

Figure 1:
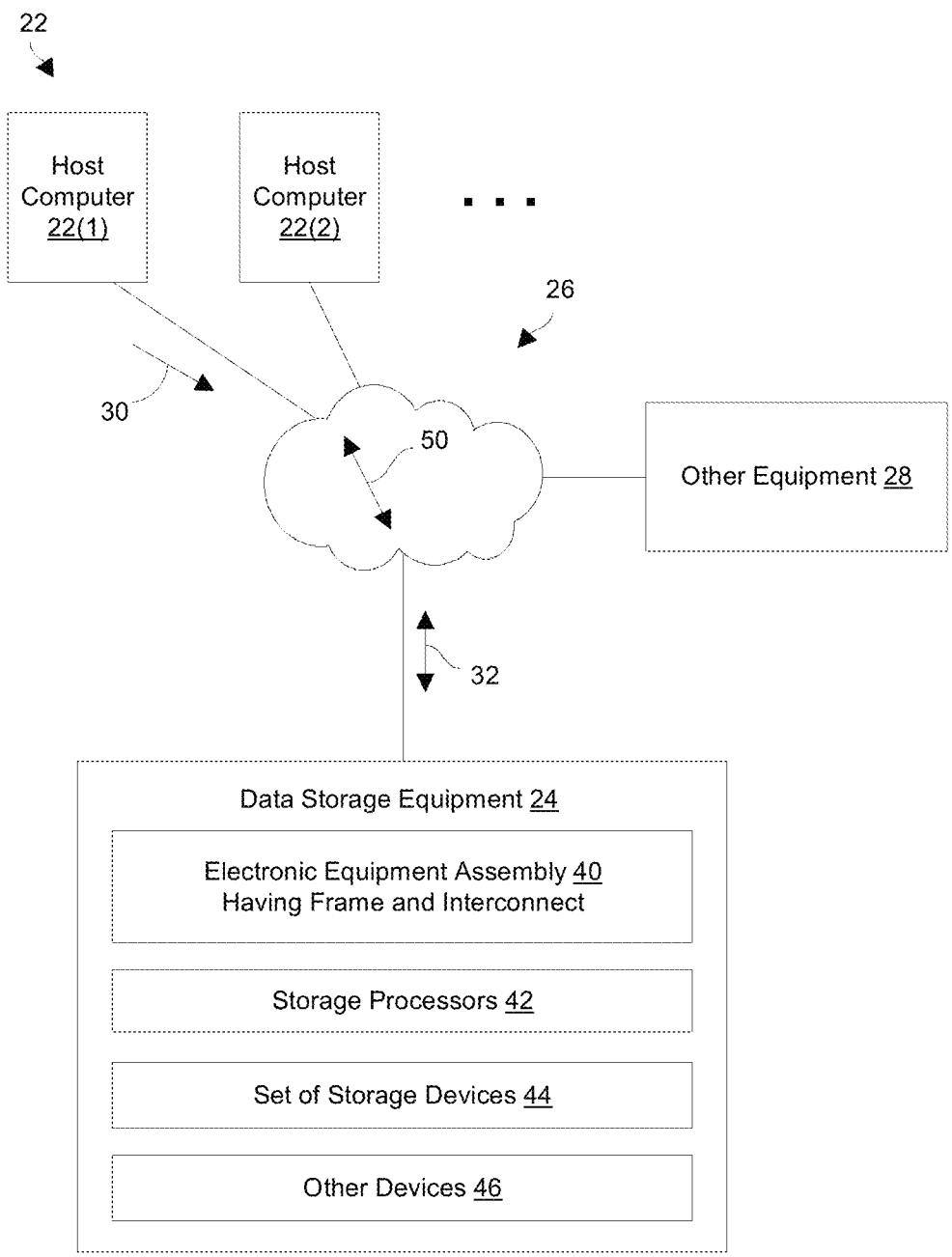
FIG. 1 is a block diagram of an electronic setting that provides communication between storage processors (SPs) through an interconnect and a set of storage devices in accordance with certain embodiments.

FIG. 1 shows an electronic setting 20 which includes data storage equipment that is capable of providing communication between SPs through an interconnect and a set of storage devices (i.e., one or more storage devices) in accordance with certain embodiments. By way of example, the electronic setting 20 is a data storage environment that includes host computers 22(1), 22(2), . . . (collectively, host computers 22), data storage equipment 24, a communications medium 26, and perhaps other equipment 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage, tiered storage, combinations thereof, etc.).

The data storage equipment 24 is an example of electronic equipment that is capable of providing communication between SPs through an interconnect and a set of storage devices. The data storage equipment 24 includes an electronic equipment assembly 40, SPs 42, a set of storage devices 44, and other devices 46.

The electronic equipment assembly 40 is constructed and arranged to support operation of various components of the data storage equipment 24. To this end, the electronic equipment assembly 40 provides connectivity among the various components, conveys power signals from power converters to the various components, positions fans along air pathways to provide cooling to the various components (i.e., to remove heat), protects the various components against tampering, damage, and so on.

As will be explained in further detail shortly, the electronic equipment assembly 40 includes a frame (e.g., rack sections, a housing, an enclosure, chassis sections, combinations thereof, etc.), and an interconnect which is disposed within the frame and which connects with the SPs 42, the set of storage devices 44, and the other devices 46. By way of example, the frame and interconnect may be configured to receive the SPs 42 through a first opening (e.g., via a rear of the electronic equipment assembly 40), and the storage devices 44 and the other devices 46 through a second opening opposite the first opening (e.g., via a front of the electronic equipment assembly 40). It should be understood that other configurations are suitable for use as well (e.g., the interconnect may be a midplane, a backplane, an assembly of circuit boards, combinations thereof, etc.).

The SPs 42 are constructed and arranged to respond to the host I/O requests 30 received from the host computers 22 by writing data into the set of storage devices 44 and reading the data from the set of storage devices 44. The SPs 42 may also be referred to as physical storage processing modules or engines, data movers, director boards, blades, etc. In accordance with certain embodiments, the SPs 42 may include a variety of specialized subcomponents such as processing circuitry to process I/O requests 30 from the host computers 22, cache memory to operate as read and/or write caches, on-board NICs to provide communications between the SPs 42 and/or external devices, LEDs and switches for local I/O, and so on.

The set of storage devices 44 is constructed and arranged to store data within the data storage equipment 24. In accordance with certain embodiments, the set of storage devices 44 may arrange the data in accordance with one or more data protection schemes (e.g., RAID1, RAID5, RAID6, RAID10, etc.). Example storage devices 44 include dual ported storage units such as RAM devices, NVRAM devices, other solid state memory devices, hard disk drives (HDDs), combinations thereof, and so on.

The other devices 46 of the data storage equipment 24 are constructed and arranged to provide supporting features. For example, the other devices 46 may include network interface controller (NIC) devices that provide communications for the data storage equipment 24, fan units that provide cooling, power supplies/units for normal power and/or backup power, and so on.

In accordance with some embodiments, the storage devices 44 and perhaps at least some of the other devices 46 have form factors that comply with the Enterprise and Data Center Solid State Device Form Factor (EDSFF) E3 Specification. However, other form factors are suitable for use as well.

The communications medium 26 is constructed and arranged to connect the various components of the electronic setting 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other equipment 28 represents other possible componentry of the electronic setting 20. Along these lines, the other equipment 28 may include remote data storage equipment that provides data to and/or receives data from the data storage equipment 24 (e.g., replication arrays, backup and/or archiving equipment, service processors and/or management/control devices, etc.). Such other equipment 28 may also be provisioned with componentry similar to that of the data storage equipment 24 to enable providing communication between storage processors (SPs) through an interconnect and a set of storage devices in a manner similar to that of the data storage equipment 24. Further details will now be provided with reference to FIGS. 2 and 3.

Figure 2:
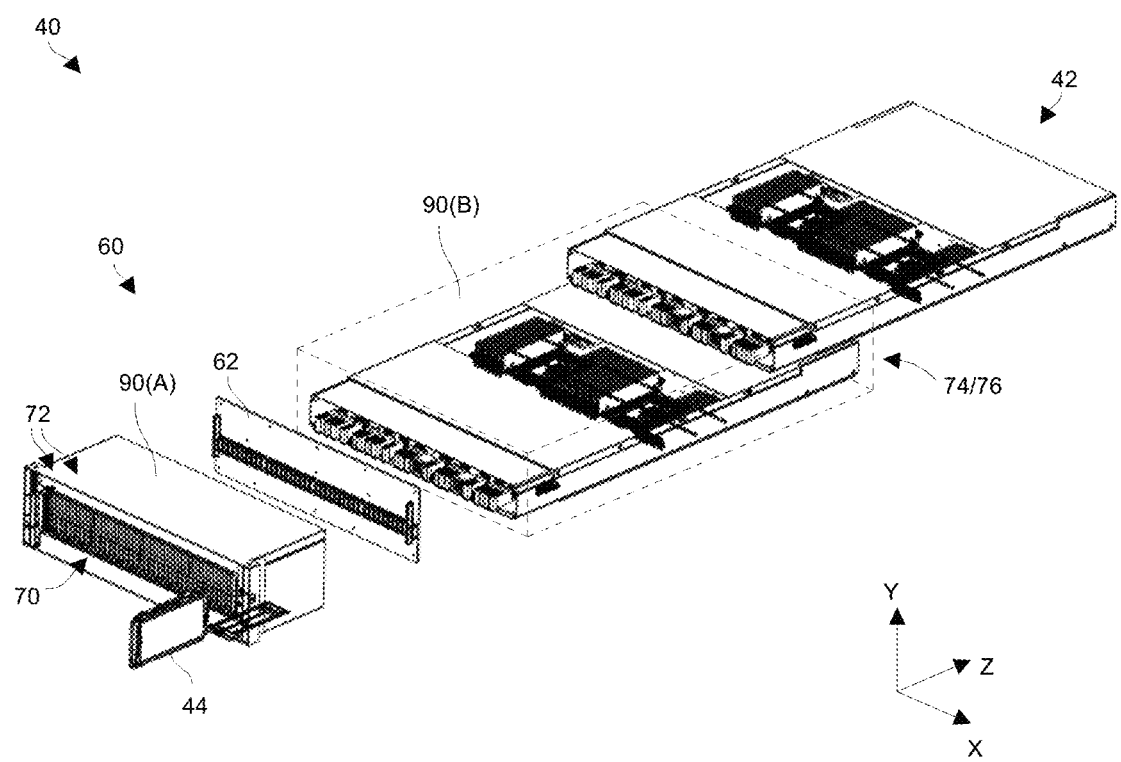
FIG. 2 is a perspective view of example storage equipment in accordance with certain embodiments.
Figure 3:
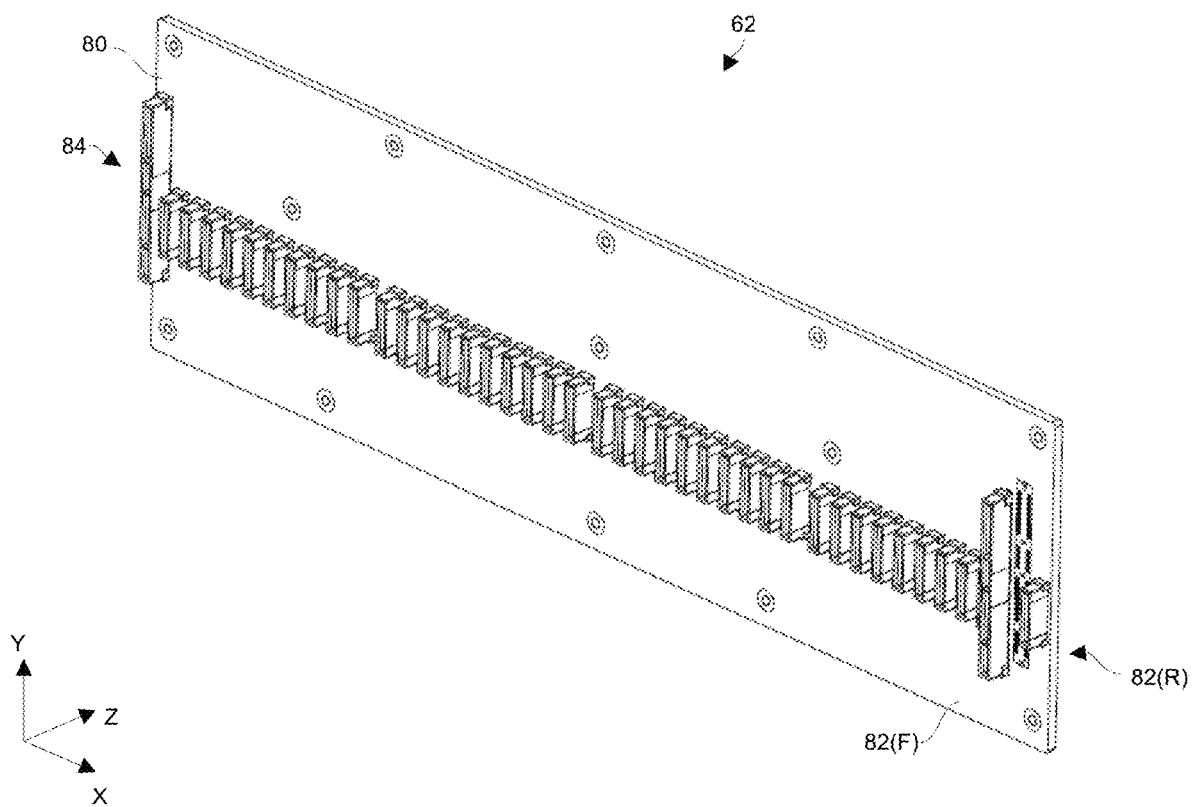
FIG. 3 is a perspective view of an interconnect in accordance with certain embodiments.

FIGS. 2 and 3 show further electronic equipment details in accordance with certain embodiments. FIG. 2 shows a perspective exploded view of a portion of the data storage equipment 24 in accordance with certain embodiments. FIG. 3 shows certain interconnect details in accordance with certain embodiments.

As shown in FIGS. 2 and 3, the electronic equipment assembly 40 includes a frame (or framework) 60 and an interconnect 62 which mainly resides within an interior region (or area) of the frame 60. Once the various components of the electronic equipment assembly 40 are properly connected together, the electronic equipment assembly 40 serves as at least a portion of a drive processor enclosure (DPE), i.e., an assembly of modular storage system components such as drives, storage processors, etc. constructed and arranged to provide data storage on behalf of a set of hosts (e.g., see the host computers 22 in FIG. 1).

As best seen in FIG. 2, the frame 60 (shown in multiple sections) defines a front opening 70 having storage drive slots 72 to receive multiple storage drives 44. Additionally, the frame 60 defines a rear opening 74 having SP slots 76 to receive multiple SPs 42. By way of example, the storage drive slots 72 extend vertically along the Y-axis, and the SP slots 76 extend horizontally along the X-axis.

As best seen in FIG. 3, the interconnect 62 includes a plane-shaped structure 80 (e.g., a multi-layered printed circuit board) having a front side 82(F) and a rear side 82(R) that is opposite the front side 82(F) and which extend in respective X-Y planes. The interconnect 62 may further have other componentry 84 mounted to the plane-shaped connecting structure 80 such as connectors, guide posts/pins, power conditioning circuitry, and so on. It should be understood that the connectors shown in FIG. 3 are by way of example only and that other componentry, arrangements, layouts, etc. are suitable for use as well.

To install a storage drive 44 within a storage drive slot 72 defined by the frame 60, a user aligns the storage drive 44 with the storage drive slot 72, and pushes the storage drive 44 through the front opening 70 in the positive Z-direction until the storage drive 44 electrically couples with the front side 82(F) of the interconnect 62 (FIG. 3). Similarly, to install a SP 42 within a SP slot 76, the user aligns the SP 42 with the SP slot 76, and pushes the SP 42 through the rear opening 74 in the negative Z-direction until the SP 42 electrically couples with the rear side 82(R) of the interconnect 62 that is opposite the front side 82(F) (FIG. 3).

In some arrangements, the various components of the electronic equipment assembly 40 includes actuating features (e.g., levers, arms, latches, tabs, nubs, etc.) that enable the user to properly align and/or lock in place the storage drives 44 and/or the SPs 42. In some arrangements, the frame 60 includes separate a front frame section 90(A) for the storage drives 44, and a separate rear frame section 90(B) (illustrated in phantom in FIG. 2) for the SPs 42. Such separate frame sections 90(A), 90(B) facilitate positioning of the midplane 62 relative to the various slots 72, 76 defined by the frame 60 for improved alignment with the midplane 62.

As explained earlier and as will be explained in further detail below, a storage device 44 may be installed within a storage drive slot 72 defined by the frame 60 (e.g., by inserting the storage device 44 into the storage drive slot 72 in the positive Z-direction). For example, if there is an unused storage drive slot 72, a user may install a storage device 44 within that storage drive slot 72 to increase storage capacity and/or communications bandwidth between the SPs 42.

Once a storage device 44 is installed within a storage drive slot 72, the SPs 42 are able to utilize the same interconnect traces to the SPs 42 as used for storing data within the storage drive 44, but instead for communications between the SPs 42. That is, recall that the storage drives 44 are multiport storage devices having a separate port and separate interconnect traces to each SP 42. Accordingly, the storage device 44 is well positioned and capable of conveying (or looping back) communications (e.g., data, commands, status, combinations thereof, etc.) between the SPs 42.

It should be understood that the SPs 42 are described as installed through the rear (or back) of the frame 60, and the storage devices 44 are described as installing through the front of the frame 60 by way of example. However, nothing precludes other installation arrangements. Moreover, nothing precludes other types of devices (e.g., network or NIC devices, expansion modules, fans, etc.) from installing in the same manner.

For example, in accordance with certain embodiments, one or more SPs 42 and one or more devices 44 install through the front of the frame 60. As another example, in accordance with certain embodiments, one or more SPs 42 and one or more devices 44 may install through the rear of the frame 60. It should be understood that, there are no physical constraints to how and/or where the SPs 42 and the devices 44 connect with the interconnect 62, but that simply one or more dual port storage devices 44 are used to increase bandwidth through the interconnect 62 between the SPs 42. Further details will now be provided with reference to FIGS. 4 through 6.

Figure 4:
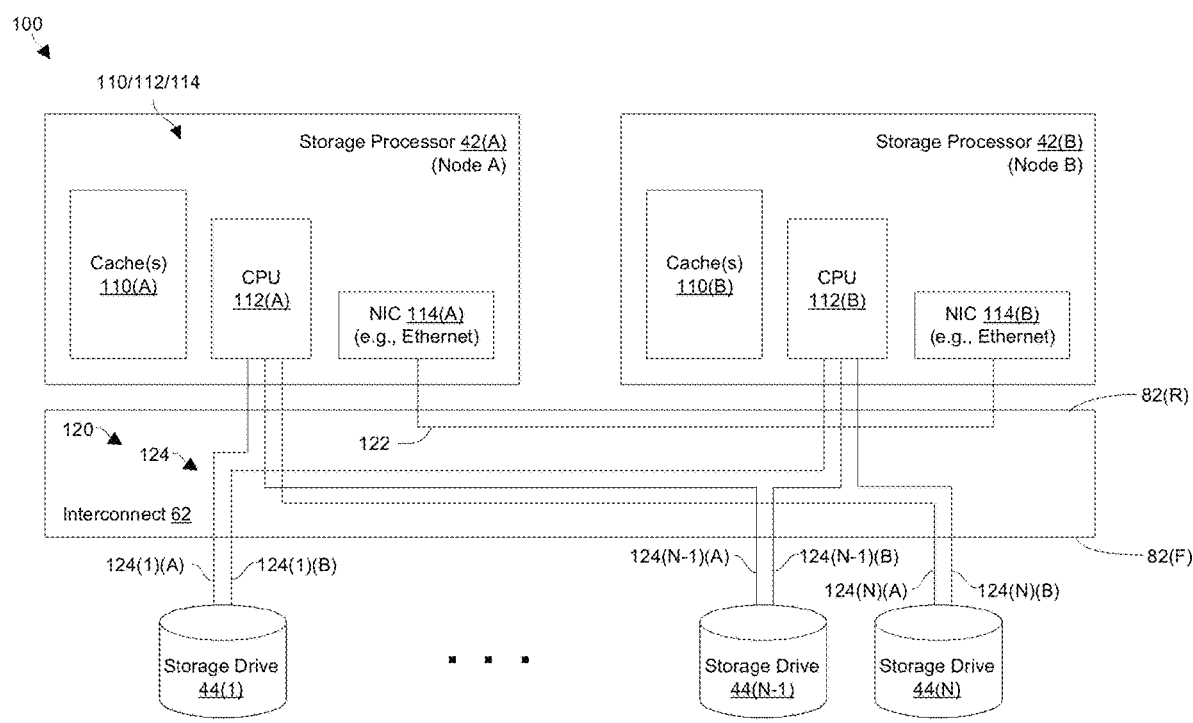
FIG. 4 is a block diagram of certain storage equipment details in accordance with certain embodiments.
Figure 5:
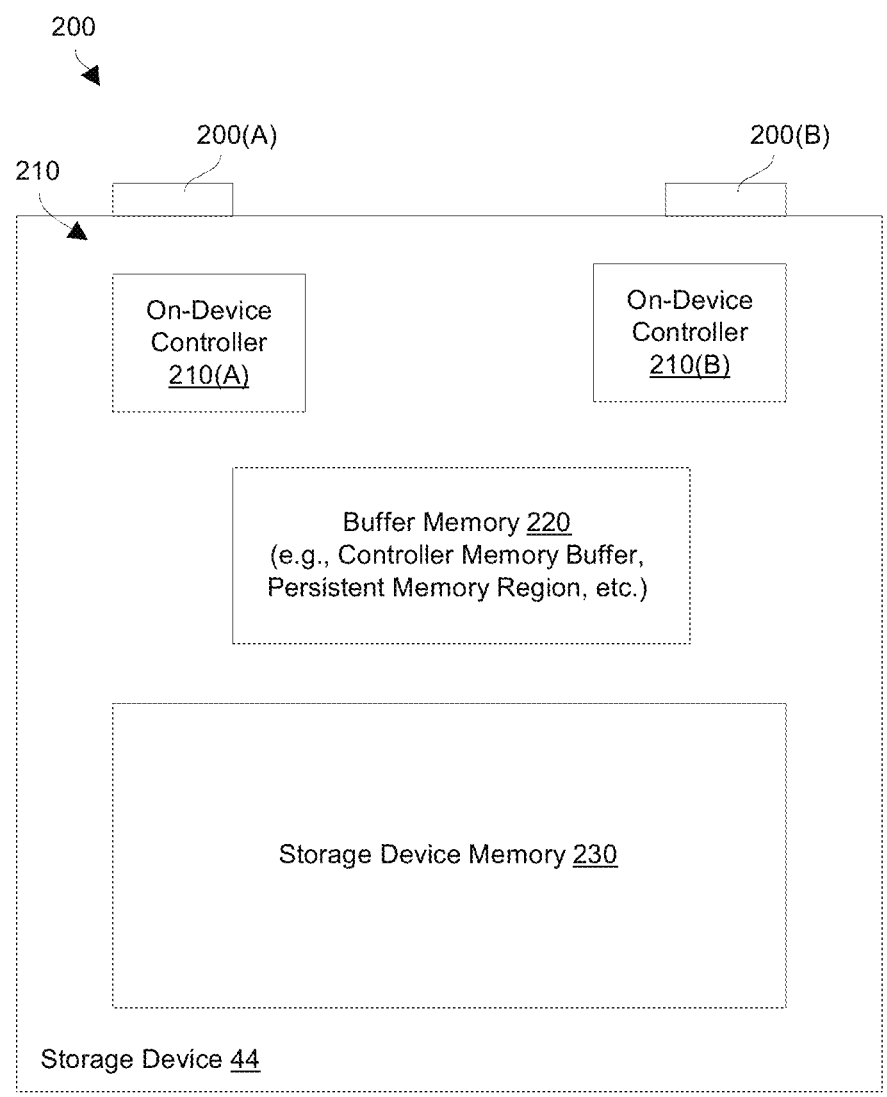
FIG. 5 is a block diagram of an example storage device in accordance with certain embodiments.

FIGS. 4 and 5 show particular details for providing communication between the SPs 42 through the interconnect 62 and a set of storage devices 44 in accordance with certain embodiments (also see the data storage equipment 24 in FIG. 1 and the electronic equipment assembly 40 in FIG. 2). FIG. 4 shows schematic details for a DPE 100 having various resources described above in connection with the data storage equipment 24. FIG. 5 shows details of an example storage device 44.

As shown in FIG. 4, the interconnect 62 of the DPE 100 has a front side 82(F) which faces and electrically couples with a set of storage devices 44(1), . . . 44(N-1), 44(N). Such storage devices 44 may have been installed within storage drive slots 72 defined by a frame 60 of the DPE 100 through a front opening 70 of the frame 60 (also see FIG. 2).

As further shown in FIG. 4, the interconnect 62 has a rear side 82(R) which faces and electrically couples with the SPs 42. Such SPs 42 may have been installed within SP slots 76 defined by the frame 60 of the DPE 100 through a rear opening 74 of the frame 60 (also see FIG. 2).

Each SP 42 includes a variety of components such as one or more caches 110, a CPU 112, an on-board network interface controller 114, and so on. In particular, the SP 42(A) (or Node A) includes cache(s) 110(A), a CPU 112(A), an on-board network interface controller 114(A), etc. Likewise, the SP 42(B) (or Node B) includes cache(s) 110(B), a CPU 112(B), an on-board network interface controller 114(B), etc.

As mentioned earlier, at least a portion of the interconnect 62 may be a planar printed circuit board (PCB) structure (e.g., layers of conductive and non-conductive material sandwiched together to provide electronic pathways). Along these lines, the interconnect 62 includes interconnect traces 120 (e.g., copper pathways, differential signal pairs, lanes, combinations thereof, etc.) that connect the SPs 42 to each other, and further connect the SPs 42 to the storage devices 44. One side of the planar PCB structure is the rear side 82(R) of the interconnect 62 that faces toward the SPs 42 and the rear opening 74 (also see FIG. 2). Another side of the planar PCB structure is the front side 82(F) of the interconnect 62 that faces opposite the rear side 82(R) and toward the storage drives 44 and the front opening 70 (FIG. 2).

As further shown in FIG. 4, the interconnect 62 includes first interconnect traces 122 that electrically connect the SPs 42 directly to each other. As shown schematically in FIG. 4, the first interconnect traces 122 connects the SPs 42 through the rear side 82(R).

Additionally, the interconnect 62 includes second interconnect traces 124 that connect the storage drives 44 directly to the SPs 42. As illustrated in FIG. 4, the second interconnect traces 124 are different from the first interconnect traces 122 in that the ends of the first interconnect traces 124 terminate on the rear side 82(R) in order to electrically connect the SPs 42 together (i.e., the first interconnect traces 122 only connect with SPs 42), while the second interconnect traces 124 extend from the rear side 82(R) to the front side 82(F) to electrically connect the SPs 42 with the storage drives 44 (i.e., one end of each second interconnect trace 124 connects with an SP 42 and the other end of that second interconnect trace 124 connects with a storage device 44).

With regard to the storage drives 44, recall that the storage drives 44 are dual ported so that each storage drive 44 is accessible by both SPs 42(A), 42(B). Accordingly, the storage drive 44(1) connects directly with the SP 42(A) through a set of interconnect traces 124(1)(A) and directly with the SP 42(B) through a set of interconnect traces 124(1)(B). Additionally, the storage drive 44(N-1) connects directly with the SP 42(A) through another set of interconnect traces 124(N-1)(A) and directly with the SP 42(B) through a set of interconnect traces 124(N-1)(B). Furthermore, the storage drive 44(N) connects directly with the SP 42(A) through yet another set of interconnect traces 124(N)(A) and directly with the SP 42(B) through a set of interconnect traces 124(N)(B), and so on.

At this point, it should be understood that when there is an available storage drive slot 72, a storage device 44 may be installed within that storage drive slot 72. Such operation may increase storage capacity of the DPE 100 and/or bandwidth between the SPs 42.

FIG. 5 shows details of an example storage device 44. The example storage device 44 includes port connectors 200(A), 200(B) (collectively, port connectors 200), on-device controllers 210(A), 210(B) (collectively, on-device controllers 210), buffer memory 220, and storage device memory 230.

The port connectors (or simply ports) 200 are constructed and arranged to connect the storage device 44 with the interconnect 62 to enable the storage device 44 to electronically communicate with the storage processors 42 (also see FIG. 4). For example, suppose that the storage device 44 connects with the interconnect 62 at the location for the storage device 44(1) in FIG. 4. As a result, the port 210(A) may connect the storage device 44 to the storage processor 42(A) through interconnect traces 124(1)(A). Likewise, the port 210(B) may connect the storage device 44 to the storage processor 42(B) through interconnect traces 124(1)(B).

The on-device controllers (or simply controllers) 210 are constructed and arranged to operate on behalf of the SPs 42 (also see FIG. 4). For example, the controller 210(A) may operate with the SP 42(A). Similarly, the controller 210(B) may operate with the SP 42(B).

The buffer memory 220 is constructed and arranged to temporarily hold data during storage device 44 operation. Such data may be managed by the on-device controllers 210 and include control and/or status information, regular data and/or metadata to be saved within the storage device memory 230, data to be transferred between the SPs 42, and so on.

The storage device memory 230 is constructed and arranged to hold data in a persistent and/or non-volatile manner. Examples include semiconductor storage, magnetic storage, combinations thereof, etc.

The storage device memory 230 is separate from the buffer memory 220. In some arrangements, the buffer memory 220 is formed by memory other than the storage device memory 230 for routinely holding data, e.g., by a persistent memory region, a controller memory buffer (CMB), similar buffer/cache memory, combinations thereof, etc.

Once a storage device 44 is connected with the interconnect 62, the SPs 42 are able to configure/manage operation of the on-device controllers 210. Along these lines, the SPs 42 may operate the on-device controllers 210 to form a communications pathway. Such a communications pathway may be formed via a series of links through the interconnect 62 and the storage device 44. In some embodiments, the links utilize messaging queue pairs (e.g., each pair of message queues including a first queue containing submission entries for messages that have been submitted for processing, and a second queue containing completion entries for submitted messages that have been processed). Further details will now be provided with reference to FIGS. 6 and 7.

Figure 6:
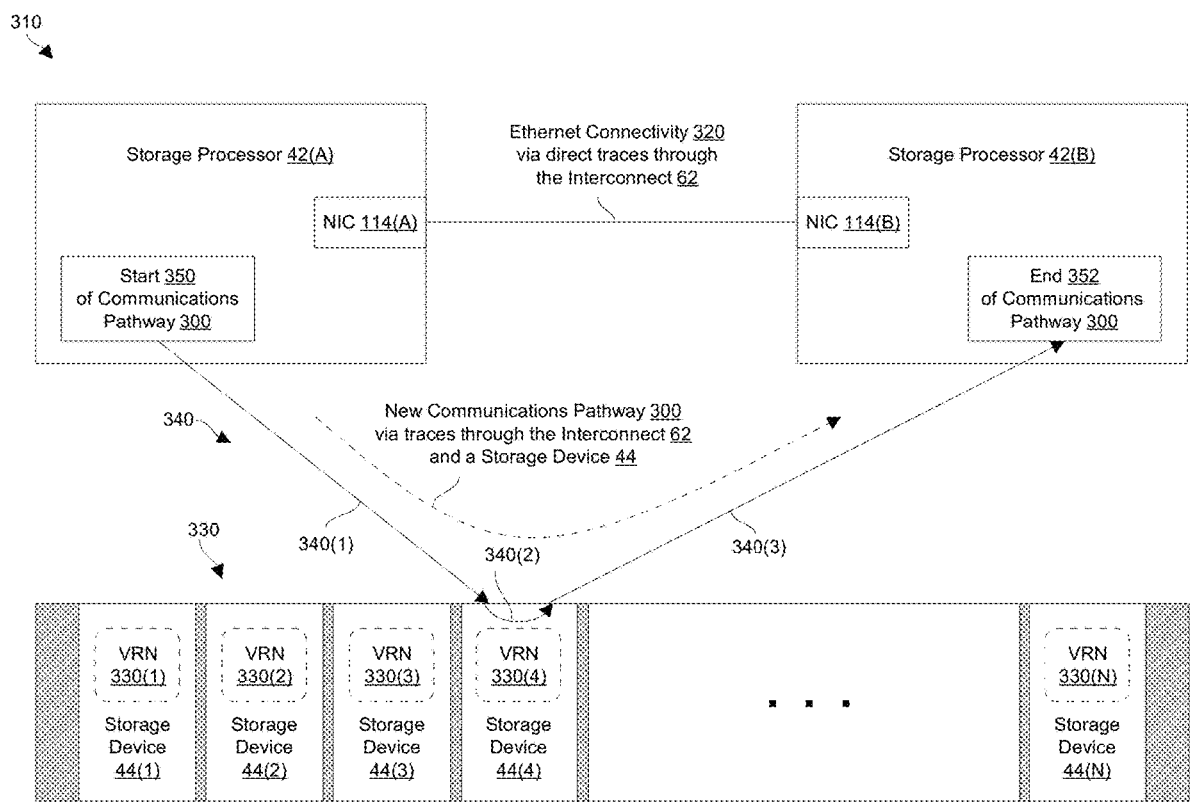
FIG. 6 is a block diagram of certain communications pathway details in accordance with certain embodiments.
Figure 7:
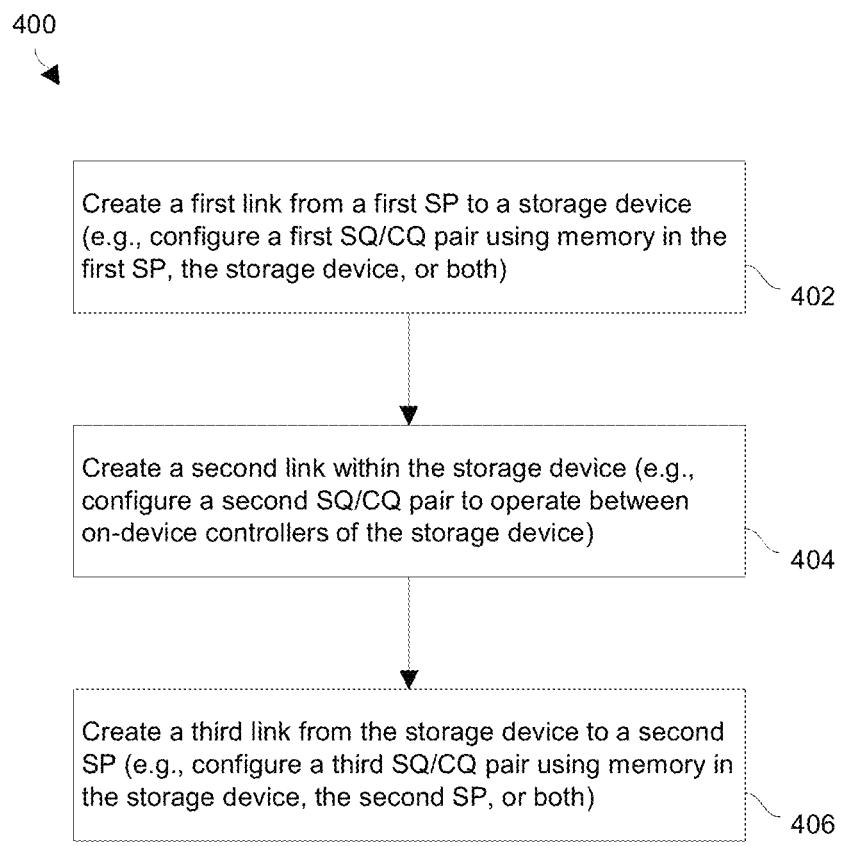
FIG. 7 is a flowchart of a procedure which is performed in order to provide a communications pathway in accordance with certain embodiments.

FIGS. 6 and 7 provide certain details for establishing a new communications pathway 300 between SPs 42 through the interconnect 62 and a storage device 44 in accordance with certain embodiments. FIG. 6 is a block diagram 310 showing certain portions of the electronic equipment assembly 40 (also see FIGS. 1 and 2). FIG. 7 is a flowchart 400 of a procedure for creating the new communications pathway 300 within the electronic equipment assembly 40.

In the block diagram 310 of FIG. 6, the interconnect 62 is omitted for simplicity. Nevertheless, it should be understood that the SPs 42 are able to directly access each other through the interconnect 62. Additionally, SPs 42 are able to directly access the storage devices 44 through the interconnect 62.

For the SPs 42 to directly access each other, the SPs 42 may have Ethernet connectivity 320 with each other via direct traces through the interconnect 62 (i.e., electrical paths with first ends at one SP 42 and second ends at the other SP 42). In some arrangements, such Ethernet connectivity 320 has bandwidth in the range of 50 Gb/s to 200 Gb/s.

Since the SPs 42 are further able to directly access the storage devices 44 through the interconnect 62, the storage devices 44 are able to serve as remote direct memory access (RDMA) loopback resources to provide further communications bandwidth between the SPs 42 (e.g., RDMA via NVMe). As will be explain in further detail shortly, such additional communications bandwidth between the SPs 42 may be implemented by creating queues to manage messages between the SPs 42 within virtual redirection namespaces 300 in a manner similar to that for an NVMe interface. Along these lines, i.e., a virtual redirection namespace (VRN) 300(1) may be configured for the storage device 44(1), another VRN 300(2) may be configured for the storage device 44(2), and so on.

With such resources in place, a new communications pathway 300 may be formed via traces through the interconnect 62 and through a storage device 44, such as the storage device 44(4) by way of example. In accordance with certain embodiments, providing the new communications pathway 300 may involve configuring a virtual redirection namespace 330(4) within the storage device 44(4), and creating a series of unidirectional links (or legs) 340 to relay messages from the SP 42(A) to the SP 42(B). Along these lines, a first unidirectional link 340(1) extends through the interconnect 62 from the SP 42(A) (see the start 350 of the communications pathway 300) to the storage device 44(4). A second unidirectional link 340(2) extends internally across ports of the storage device 44(4) (also see the storage device ports 200 in FIG. 5). A third unidirectional link 340(3) extends through the interconnect 62 from the storage device 44(4) to the SP(B) (see the end 352 of the communications pathway 300). Further details regarding such communications pathway creation will be provided shortly. In some arrangements, the bandwidth through the communications pathway 300 from the SP 42(A) to the SP 42(B) is in the range of 25 Gb/s to 50 Gb/s, although other bandwidths (higher than 50 Gb/s or lower than 25 Gb/s) are suitable for use as well.

It should be understood that communications between the SPs 42 may be augmented by adding other communications pathways 300. For example, another communications pathway 300 may be added using the same storage device 44(4) to enable communications in the opposite direction by forming another series of links 340 from the SP 42(B) to the SP 42(A) through the interconnect 62 and the storage device 44(4). As another example, additional communications pathways 300 may be formed through the interconnect 62 and one or more other storage devices 44 (e.g., the storage device 44(1), the storage device 44(2), and so on) to add further bandwidth between the SPs 42.

With reference now to FIG. 7, the procedure 400 establishes the communications pathway 300 from the SP 42(A) to the SP 42(B) through the interconnect 62 and the storage device 44(4) (also see FIG. 6). As mentioned in connection with FIG. 6 and in accordance with certain embodiments, the communications pathway 300 may be formed by creating a series of links 340.

It should be understood that the SPs 42 may initially communicate via the Ethernet connectivity 320 to coordinate establishing the communications pathway 300. This initial exchange may involve the SPs 42 agreeing on communications parameters, direction (e.g., from the SP 42(A) to the SP 42(B)), destination memory size, etc. Additionally, the allocated memory may be registered and pinned for this purpose, e.g., in a manner similar to "rdma_reg" functions in Linux.

Alternatively, the SPs 42 may establish the communications pathway 300 as part of a bootstrap/init sequence. Along these lines, the SPs 42 may register respective memory areas, and inform the respective on-device controllers 210 (also see FIG. 5). The SPs 42 may then create a redirection namespace and coordinate with the on-device controllers 210 to configure the various links 340.

At 402, the procedure 400 creates the first link 340 from the SP 42(A) to a storage device 44 (e.g., see the link 340(1) in FIG. 6). Along these lines, the SP 42(A) creates a first messaging queue pair within the virtual redirection namespace for that storage device 44. That is, the SP 42(A) creates a submission queue (SQ) to hold entries identifying messages that are ready for sending forward from the SP 42(A), and a completion queue (CQ) to hold entries identifying messages that have been sent forward in order to provide acknowledgement.

The memory for the first messaging queue pair may reside within the SP 42(A), the storage device 44, or both. Along these lines, a region of cache within the SP 42(A) may be used to hold the first messaging queue pair (also see FIG. 3). Alternatively, memory within the storage device 44 (e.g., a persistent memory region, CMB, combinations thereof, etc.) may be used to hold the first messaging queue pair (also see the buffer memory 220 in FIG. 5).

At 404, the procedure 400 similarly creates a second link 340 within the storage device 44 (e.g., see the link 340(2) in FIG. 6). Along these lines, the SP 42(A) directs the on-device controllers 210 (FIG. 5) to create a second messaging queue pair. This second messaging queue pair includes a SQ to hold entries identifying messages that are ready for sending forward from the first link 340 to a third link 340 that leads to the SP 42(B), and a CQ to hold entries identifying messages that have been sent forward in order to provide acknowledgement.

The memory for the second messaging queue pair resides within the storage device 44 (e.g., see FIG. 5). Such memory may be formed by a persistent memory region, CMB, similar buffer/cache memory, combinations thereof, etc.

At 406, the procedure 400 creates the third link 340 from the storage device 44 to the SP 42(B) (e.g., see the link 340(3) in FIG. 6). Along these lines, the SP 42(B) may create a third messaging queue pair (although in some embodiment this third pair is unnecessary). This third messaging queue pair includes a SQ to hold entries identifying messages that are ready for sending forward from the second link 340 to the SP 42(B), and a CQ to hold entries identifying messages that have been sent forward in order to provide acknowledgement.

The memory for the third messaging queue pair may reside within the storage device 44 and/or the SP 42(B). However, the SP 42(B) further provides memory that serves as the destination for the message sent from the SP 42(A) which have been conveyed through the links 340.

Moreover, it should be understood that, in a manner similar to that for the SP 42(A) and the storage device 44, the SP 42(B) and the storage device 44 coordinate (or register) the memory for DMA (i.e., the SP 42(B) provides the location to the respective on-device controller 210 (e.g., see the on-device controller 210(B) in FIG. 6).

The various activities 402, 404, and 406 of the procedure 400 were described above as being performed in a particular order by way of example only. However, it should be understood that 402, 404, and 406 may be performed in a different order or even concurrently. Moreover, certain activities may be merged, combined, and/or divided into smaller activities.

With the communications pathway 300 from the SP 42(A) to the SP 42(B) now established, the SP 42(A) may convey data to the SP 42(B). In particular, the SP 42(A) sends messages to the SP 42(B) through the series of links 340. Further details of such a process will now be provided with reference to FIG. 8.

Figure 8:
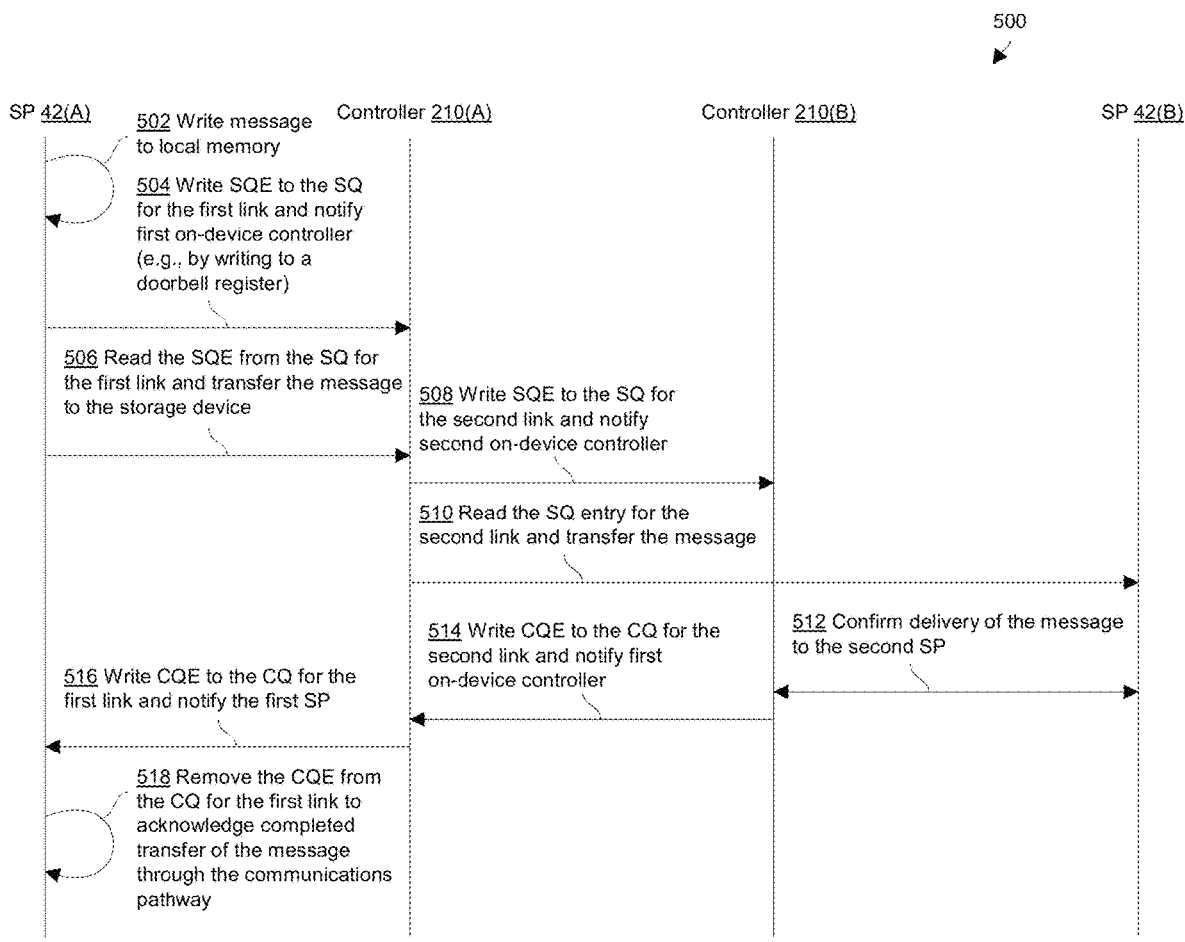
FIG. 8 is sequence diagram showing certain activities for conveying a message through a communications pathway in accordance with certain embodiments.

FIG. 8 is a sequence diagram 500 showing certain activities for conveying a message through a communications pathway 300 in accordance with certain embodiments. In particular, the sequence diagram 500 illustrates conveyance of a message from the SP 42(A) to the SP 42(B) through a storage device 44 equipped with first and second on-device controllers 210 (also see the storage device 44 in FIG. 5 and the communications pathway 300 through the storage device 44(4) in FIG. 6).

At 502, the first SP 42(A) writes the message into its local memory. The message will be conveyed through the series of links 340 of the communications pathway 300 to the second SP 42(B) (also see FIG. 6).

At 504, the first SP 42(A) writes a submission queue entry (SQE) to the submission queue (SQ) for the first link 340(1) and notifies the first on-device controller 210(A) that the message has been submitted for transfer. The SQE contains the location in the local memory of the SP 42(A) for the message being sent, the message size, the destination location within local memory of the second SP 42(B), etc. Recall that is was explained earlier that the memory holding the messaging queues (e.g., a SQ/CQ pair) for the first link 340(1) may reside in the SP 42(A) (e.g., cache) and/or the storage device 44 (e.g., CMB). By way of example, the SP 42(A) notifies the first on-device controller 210(A) that the message has been submitted into its local memory for transfer by writing to a doorbell register which is monitored by the first on-device controller 210(A) although it should be understood that other notification mechanisms are suitable for use as well (e.g., polling, event or interrupt driven, etc.).

At 506, in response to the notification, the first on-device controller 210(A) reads the SQE for the first link 340(1) and transfers the message from the local memory of the SP 42(A) to memory within the storage device 44 based on the information in the SQE. In accordance with certain embodiments, the first on-device controller 210(A) moves the message from the local memory of the SP 42(A) to buffer memory of the storage device 44 (e.g., CMB) using a DMA operation.

At 508, after the message has been transferred from the SP 42(A) to the storage device 44, the first on-device controller 210(A) writes a SQE to the SQ for the second link 340(2) and notifies the second on-device controller 210(B) that the message has been submitted for transfer. Again, the SQE for the second link 340(2) contains information similar to that of the SQE for the first link 340(1) (e.g., the location of the message, the message size, and the destination location within local memory of the SP 42(B), etc.). Recall that it was explained earlier that the messaging queues for the second link 340(2) reside within the storage device 44 (e.g., CMB). By way of example, the first on-device controller 210(A) may notify the second on-device controller 210(B) that the message has been submitted for transfer by writing to another doorbell register which is monitored by the second on-device controller 210(B) although other notification mechanisms are suitable for use as well (e.g., polling, interrupts, and so on).

At 510, in response to the notification, the second on-device controller 210(B) reads the SQE for the second link 340(2) and, based on the information in that SQE, moves the message from the buffer memory of the storage device 44 (e.g., CMB) to the destination location within the local memory of the SP 42(B) thus delivering the message to the SP 42(B). In accordance with certain embodiments, the second on-device controller 210(B) performs a DMA operation to write the message to the destination location in local memory of the SP 42(B).

At 512, the second on-device controller 210(B) confirms delivery of the message to the SP 42(B). In some arrangements, the second on-device controller 210(B) utilizes a SQ/CQ pair for the third link 340(3) and/or further notifies the SP 42(B) of the transferred message using a doorbell register. In such arrangements, the SP 42(B) writes a completion queue entry (CQE) to the completion queue (CQ) for the third link 340(3) and provides a notification to the on-device controller 210(B) when the SP 42(B) consumes (i.e., formally receives) the delivered message. However, it should be understood that other message mechanisms are suitable for the on-device controller 210(B) to confirm delivery of the message to the SP 42(B).

At 514, after the second on-device controller 210(B) confirms delivery of the message, the second on-device controller 210(B) writes a CQE to the CQ for the second link 340(2) to indicate that the message has been processed through the second link 340(2) and notifies the first on-device controller 210(A). Again, such notification may utilize a doorbell register.

At 516, in response to the notification from the second on-device controller 210(B), the first on-device controller 210(A) writes a CQE to the CQ for the first link 340(1). Additionally, the on-device controller 210(A) notifies the SP 42(A) (e.g., via a doorbell register).

At 518, in response to the notification from the first on-device controller 210(A), the SP 42(A) removes the CQE from the CQ for the first link 340(1). Moreover, the SP 42(A) treats this activity as the SP 42(A) acknowledging that the SP 42(B) has successfully received the message through the communications pathway 300.

It should be understood that the various components in the sequence diagram 500 removed (or invalidated) the SQEs and CQEs upon completion of the respective activities. Similarly, the various components in the sequence diagram 500 reset and/or reconfigured various resources upon use (e.g., reset a doorbell register upon notification), and so on.

It should be understood that the communications pathway 300 is capable of supporting conveyance of multiple messages simultaneously. Along these lines, the utilization of messaging queues (e.g., SQ/CQ pairs) enables the various components to manage transfer of multiple messages through the communications pathway 300 at the same time.

Although the sequence diagram 500 described conveyance of a message from the SP 42(A) to the SP 42(B), it should be understood that another communications pathway 300 may be established in the opposite direction from the SP 42(B) to the SP 42(A). Accordingly, messages may be conveyed from the SP 42(B) to the SP 42(A) through the other communications pathway in a similar manner.

In some arrangements, multiple communications pathways are formed in the same direction through a storage device 44. Such arrangements may provide multi-pathing through a single storage device 44.

It should be further understood that the multiple storage devices 44 may be employed to further increase communications bandwidth between the SPs 42. Along these lines, the bandwidth contributions through the storage devices 44 may be aggregated together.

In some embodiments, a new namespace is created for each storage device 44 that is to contribute bandwidth. Message transfer utilizing the namespaces may then be managed in a variety of ways, e.g., multipathing, load balancing, combinations thereof, etc. Moreover, the bandwidth provided by the storage devices 44 may be smartly managed to accommodate various situations, e.g., dynamic load balancing due to hot plugging, surprise removal, storage device failure, and so on.

Additionally, the bandwidth may be allocated to address quality of service (QOS) requirements. For example, certain SQ/CQ pairs may be allocated for certain links, arbitration, prioritization, etc.

Such features enable and/or enhance scalability, efficiency, optimal allocation of resources, and so on. Moreover, such features provide flexibility to overall equipment design and/or provisioning, e.g., Ethernet connectivity resources may be scaled down such as to 1 Gb/s or 10 Gb/s or even removed since communications bandwidth through one or more storage devices 44 is now available.

As described above, improved techniques are directed to providing communication between SPs (or other types of nodes) 42 through an interconnect 62 and a set of storage devices 44. Along these lines, dual port capabilities of the set of storage devices 44 may be leveraged to provide communications bandwidth between the SPs 42. For an existing interconnect 62, the set of storage devices 44 may enable an efficient scalable connection to be provided between SPs 42 without modifications to the existing interconnect 62 and without requiring additional cabling and/or SP hardware. Additionally, in accordance with certain embodiments, multiple storage devices 44 may be used to aggregate/scale bandwidth through the interconnect for high information exchange among the SPs 42.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 20 such as the host computers 22 are capable of being implemented in or "moved to"

the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be appreciated that a high bandwidth and low latency interface is advantageous for a dual node storage system. In a DPE, it is important to leverage connectivity through the DPE midplane without cables. In some cases, the midplane is limited to a specific throughput due to amount of lanes/PCIe generation/amount of dedicated ETH ports/controller capability. Accordingly, a higher bandwidth is desirable, without making changes to existing midplane.

Consider a distributed storage system with nodes that consist of a multi core CPU, where two adjacent nodes share a DAE (Disk Array Enclosure) with SSD drives. The dual nodes with the shared DAE may construct a DPE (drive processor enclosure). A high bandwidth and low latency interface is required for communication between the dual nodes inside the DPE.

It is desirable to leverage PCIe/NTB or ETH/RDMA direct connectivity (50 Gb/s-200 Gb/s) through the DPE midplane—without cables. However, in some cases, the midplane is limited to a specific throughput due to amount of lanes/PCIe generation/amount of dedicated eth ports/controller capability/link speed due to PCB material etc. Therefore, it may be advantageous to provide higher bandwidth through the existing midplane, without making changes to midplane.

In accordance with certain embodiments, there are "DPE Interconnect via Shared NVMe media" techniques to provide an efficient scalable connection between the dual nodes inside a DPE, using NVMe SSDs and what may be referred to as virtual redirection namespaces, without any modification to the existing midplane, and without requiring adding additional hardware or externally cabled ethernet HBAs.

In some embodiments, there is DPE Interconnect via Shared NVMe media with the following features:
1) The backend interface of the DPE connects the nodes to the DAE, and has plenty of available BW.
2) Each drive slot has a ×2 Gen4/5 PCIe lanes per Node, which translates to 25 Gb/s to 50 Gb/s.
3) NVMe devices have DMA engines built in them.
4) The CMB (Controller Memory Buffer) is used on NVMe devices.

In some embodiments, an interconnect (RDMA-like) over the backend NVMe interface is provided and the controllers of the SSD drive, and dual port capabilities are leveraged. Along these lines, such componentry offers a loopback interface that provides access to the adjacent node. Furthermore, multiple drives may be used to aggregate bandwidth and achieve higher bandwidth.

Suppose that it is desirable to provide communication through a connection in the direction from Node1 to Node2, i.e., Node1 sending messages to Node2:
1) The communication in the opposite direction can be in the same way.
2) The connection goes through three links:
  2.1. Node1-Controller1: The link between Node1 and the SSD controller attached to port1 of the drive. Node1 will communicate with Controller1 in the same way as done for writing to the drive i.e., through a SQ/CQ (Submission/Completion queue) pair.
  2.2. Controller1-Controller2: Two SSD controllers will communicate in the same manner, using SQ/CQ pair located on the CMB, which is accessible to both controllers.
  2.3. Controller2-Node2: This link is between Controller2 and the SSD controller attached to port2 of the drive. This link only requires Node2 to register a memory area, to which Controller2 will DMA write to.
3) The sender node will manage the destination area in the receiving node—the sender node will provide the destination location within the registered memory of the receiving node. For example, when Node1 sends a message to Node2, the sender Node1, will specify the destination location within Node2 registered memory.

For the configuration, the Nodes will communicate on traditional Ethernet interfaces (which doesn't have to be fast i.e., 1G/10G) and agree on the communication parameters, such as the direction (e.g., Node1 to Node2), the destination memory size, etc. The memory will be registered and pinned for this purpose, exactly as in the Linux "rdma_reg_mr" traditional function.

Alternatively, each node may execute a bootstrap/init sequence. For example, initially, each node will register a memory area, and report that to the SSD controller. Then, each node will ask to create a redirection namespace, and the SSD controllers will configure the other links.

Following describes the connection configuration:
1) Virtual Redirection Namespace: Node 1 will configure a "Virtual Redirection Namespace" within the SSD. As opposed to writing to Flash, this namespace is not backed up by actual NAND, but rather used as loopback to provide access to the adjacent node.
  a. The size of the namespace shall be the size of the shared DMA-able memory configured on the node.
  b. Most commands will not be available on this namespace, other than write and mandatory commands for identification and QOS.
2) Node1-Contoller1: Node1 will create SQ/CQ pair within "Virtual Redirection Namespace", in the same way as done for standard NVMe interface. The SQ may be located either in Node1's memory or in CMB.
3) Controller1-Controller2: Node1 creating the link with Controller1, is a trigger for Controller1 to create the corresponding SQ/CQ link with Controller2. Both queues will be located on the CMB, which is accessible to both controllers.
4) Controller2-Node2: Node2 will allocate a memory area that will be used as the destination for messages sent from Node1. Node2 will register this memory for DMA, and provide its location to Contoller2.

The following describes the write flow (Node1 sends a message to Node2) in accordance with certain embodiments.
1) Node1 writes a message in its local memory.
2) Node 1 writes a SQE (submission queue entry) to the SQ, containing the location of the message to send, its size, and the destination location within Node2 memory.
3) Node 1 notifies Controller1 about the new SQE by writing to doorbell register.

4) Controller1 reads the SQE and the transfer the corresponding message to CMB using DMA.
5) Controller1 places a SQE for Controller2, containing the location of the message to send, its size, and the destination location within Node2 memory.
6) Controller1 notifies Controller2 about the new SQE. As both controllers are in the same silicon and have shared resources, there could be multiple ways for them to communicate. For now, we will just use a conventional doorbell, as used in the other queues.
7) Controller2 reads the new SQE and perform DMA operation to write the message to the destination location within Node2 memory.
8) Controller2 writes CQE (completion queue entry) for Controller1 and notifies it.
9) Controller1 writes a corresponding CQE to Node1.
10) Node1 dequeues the CQE.

In accordance with certain embodiments, the bandwidth provided by multiple devices may be aggregated as follows:
1) A new namespace will be created for every capable drive in the DPE.
2) Using traditional block devices multipathing, we would load balance all the IOs across the drives, allowing a BW if Nx50 Gb/s. For example, a DPE of 40×Gen5 drives can allow an interconnect of up to 2 Tb/s per direction.
3) Allocate a single NVMe GUID for all the devices. In order to leverage existing multipathing tools. Hot plug and surprise removal are already supported in this case.

In accordance with certain embodiments, it should be further understood that:
1) Interconnect QOS: multiple SQ/CQ pairs may be created for the Node1-Controller1 link, and by leveraging the NVMe QOS capabilities (arbitration scheme), we could limit/prioritize IOs as needed.
2) Similarly, QOS can be achieved between the regular IO queues of the SSDs and the interconnect queues, to prioritize/limit as needed.

It should be appreciated that certain techniques disclosed herein allow for an efficient and scalable connection between the dual nodes, without any modification to the existing midplane, and without requiring adding additional HW or externally cabled ethernet HBAs. More supporting drives may be added for increased BW.

Additionally, there is reduced cost of the DPE, as the existing fast ETH connectivity between the nodes may be either eliminated or scaled down to a cheap low BW ethernet device (1G, 10G).

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of providing communication between storage processors (SPs) of a storage array, the method comprising:
electrically coupling the SPs with an interconnect of the storage array;
electrically coupling a storage device having dual on-device controllers with the interconnect; and
establishing a communications pathway between the SPs through the interconnect and the storage device having the dual on-device controllers while the SPs are electrically coupled with the interconnect and while the storage device is electrically coupled with the interconnect.

2. The method of claim 1 wherein the SPs of the storage array include a first SP and a second SP; and
wherein establishing the communications pathway includes:
providing a first link between the first SP and the storage device through the interconnect, and
providing a second link between the storage device and the second SP through the interconnect.

3. The method of claim 2 wherein the dual on-device controllers of the storage device include a first on-device controller and a second on-device device controller;
wherein providing the first link includes:
creating, as the first link, a first segment of the communications pathway from the first SP to the first on-device controller; and
wherein providing the second link includes:
creating, as the second link, a second segment of the communications pathway from the second on-device controller to the second SP.

4. The method of claim 3 wherein establishing the communications pathway further includes:
creating, as a third link, a third segment of the communications pathway from the first on-device controller to the second on-device controller.

5. The method of claim 4, further comprising:
after the first, second and third links are created, relay messages from the first SP to the second SP through the first, second and third links.

6. The method of claim 1 wherein the SPs of the storage array include a first SP and a second SP; and
wherein establishing the communications pathway includes:
creating a virtual redirection namespace within the storage device, and
creating a set of queues within the virtual redirection namespace to coordinate conveyance of messages from the first SP to the second SP.

7. The method of claim 6 wherein creating the set of queues includes:
configuring a submission queue to hold submission queue entries identifying locations of messages written by the first SP into the virtual redirection namespace to be processed, sizes of the messages, and destination locations within the second SP for the messages.

8. The method of claim 7 wherein creating the set of queues further includes:
configuring a completion queue to hold completion queue entries that identify locations of messages written by the first SP into the virtual redirection namespace that have been processed.

9. The method of claim 8 wherein establishing the communications pathway further includes:
providing a set of doorbell registers to indicate when an entry has been added to the set of queues.

10. The method of claim 1 wherein the storage device is a solid state drive (SSD);
wherein the dual on-device controllers of the storage device include a first SSD controller and a second SSD controller; and wherein establishing the communications pathway includes:
configuring the first SSD controller and the second SSD controller to communicate with each other to provide, as a portion of the communications pathway, a loopback path from the first SSD controller to the second SSD controller.

11. The method of claim 10 wherein electrically coupling the SPs with the interconnect of the storage array includes:
connecting a first SP to the interconnect, and
connecting a second SP to the interconnect; and
wherein electrically coupling the storage device having the dual on-device controllers with the interconnect includes:
connecting the SSD to the interconnect to enable (i) the first SP and the first SSD controller to communicate with each other through the interconnect and (ii) the second SP and the second SSD controller to communicate with each other through the interconnect.

12. The method of claim 11 wherein the SSD includes a first port and a second port; and
wherein configuring the first SSD controller and the second SSD controller to communicate with each other includes:
exchanging signals between the first SP and the first SSD controller through a first set of traces of the interconnect and the first port of the SSD, and
exchanging signals between the second SP and the second SSD controller through a second set of traces of the interconnect and the second port of the SSD, the second set of traces being different from the first set of traces.

13. The method of claim 12 wherein the first set of traces includes first Peripheral Component Interconnect Express (PCIe) lanes;
wherein the second set of traces includes second PCIe lanes; and
wherein the method further comprises:
performing first direct memory access (DMA) operations that provide the first SP with sharable DMA to SSD memory of the SSD through the first PCIe lanes, the first SSD port and the first SSD controller, and
performing second DMA operations that provide the second SP with sharable DMA to the SSD memory of the SSD through the second PCIe lanes, the second SSD port and the second SSD controller.

14. The method of claim 12 wherein the first set of traces includes first Peripheral Component Interconnect Express (PCIe) lanes;
wherein the second set of traces includes second PCIe lanes; and
wherein the method further comprises:
accessing SSD memory of the SSD in accordance with the non-volatile memory express (NVMe) protocol.

15. The method of claim 1 wherein the communications pathway is established as a first single direction channel to convey first messages in a first direction from the first SP to the second SP; and
wherein the method further comprises:
establishing another communications pathway between the SPs through the interconnect and the storage device having the dual on-device controllers while the SPs are electrically coupled with the interconnect and while the storage device is electrically coupled with the interconnect, the other communications pathway being established as a second single direction channel to convey second messages in a second direction from the second SP to the first SP.

16. The method of claim 15, further comprising:
conveying third messages between the SPs through interconnect, the third messages passing only through the interconnect and avoiding passing through any storage device.

17. The method of claim 1, further comprising:
electrically coupling another storage device having dual on-device controllers with the interconnect; and
establishing another communications pathway between the SPs through the interconnect and the storage device having the dual on-device controllers while the SPs are electrically coupled with the interconnect and while the other storage device is electrically coupled with the interconnect.

18. The method of claim 17, further comprising:
aggregating bandwidth provided through the storage devices to increase overall bandwidth between the SPs.

19. Data storage equipment, comprising:
an interconnect;
storage processors (SPs) constructed and arranged to electrically couple with the interconnect; and
a storage device constructed and arranged to electrically couple with the interconnect, the storage device being constructed and arranged to establish at least a portion of a communications pathway between the SPs while the SPs are electrically coupled with the interconnect and while the storage device is electrically coupled with the interconnect.

* * * * *